United States Patent [19]

Hashimoto

[11] Patent Number: 4,516,741

[45] Date of Patent: May 14, 1985

[54] SPOOL BRAKING DEVICE FOR DOUBLE-BEARING FISHING REEL

[75] Inventor: Hiroshi Hashimoto, Tokyo, Japan

[73] Assignee: Daiwa Seiko Inc., Higashikurume, Japan

[21] Appl. No.: 452,960

[22] Filed: Dec. 27, 1982

[51] Int. Cl.$^3$ .................................. A01K 89/02
[52] U.S. Cl. ........................... 242/217; 192/93 A
[58] Field of Search ............. 242/217, 219, 211–216, 242/218, 220–221; 192/66 R, 93 A, 96

[56] References Cited

U.S. PATENT DOCUMENTS

| | | | |
|---|---|---|---|
| 3,000,477 | 9/1961 | Dunn | 242/214 |
| 3,017,135 | 1/1962 | Wood, Jr. | 242/218 |
| 3,425,644 | 2/1969 | Griste | 242/219 X |
| 3,478,979 | 11/1969 | Henze | 242/219 X |
| 3,771,746 | 11/1973 | Griste | 242/219 X |
| 3,993,267 | 11/1976 | Murvall | 242/217 |

*Primary Examiner*—John M. Jillions
*Attorney, Agent, or Firm*—Browdy and Neimark

[57] ABSTRACT

The present invention provides a spool braking device for a double-bearing of fishing reel in which a lever for the fine adjustment of the spool braking force is provided on the same spool shaft as that of a lever for the coarse adjustment of the braking force so that the spool braking force can be adjusted coarsely and finely, in a smooth and rapid manner in the same direction over a wide adjustment range.

6 Claims, 4 Drawing Figures

SPOOL BRAKING DEVICE FOR DOUBLE-BEARING FISHING REEL

BACKGROUND OF THE INVENTION

This invention relates to an improvement in a spool braking device for a double-bearing fishing reel.

The conventional means for adjusting the braking force of the spool in a double-bearing fishing reel, especially in a large double-bearing fishing reel, has the construction in which an adjustment lever rotating around a reel side-plate is provided on the reel side-plate on the attachment end of a rotary handle so as to rough-adjust the braking force while a dial knob for fine-adjustment is fitted to the reel side-plate to make the fine adjustment. Such prior art devices are disclosed in U.S. Pat. Nos. 3,478,979 and 3,425,644, for example.

However, the mode of braking the spool varies with the kind of fishing. In other words, some kinds of fishing do not require much adjustment once the braking quantity is set, while others require frequent adjustment of the braking force during fishing. In the latter case, especially, the adjustment operation must be carried out rapidly and reliably.

In the conventional system described above, however, the adjustment lever and the fine adjustment dial knob can not be rotated simultaneously and rapidly. In particular, when the spool is set for braking, it is difficult to release it so that it can rotate completely freely in order to pay out the fishing line, or to return a freely-rotating spool after the fishing line has been paid out to the original braking state in a rapid and smooth way. In addition, the adjustment quantity of the fine adjustment dial knob can not be clearly checked by eye when fishing.

SUMMARY OF THE INVENTION

The present invention is designed to eliminate all these problems with the prior art. The first characterizing feature of the present invention is that a lever for the fine adjustment of the spool braking force is provided on the same spool shaft as that of an operation lever for the coarse adjustment of the braking force so that the adjustment of the braking force is in the same direction, and an adjustment of the spool braking force over a wide range can be made quickly, smoothly and lightly.

The second characterizing feature of the present invention is that the operation lever for the coarse adjustment of the spool braking force and the operation lever for the fine adjustment can be rotated to substantially the same angle on the same lever shaft so that both levers can be operated simultaneously.

According to this construction, the spool can be operated extremely conveniently by two fingers so as to bring the spool from its braking condition to a freely rotating condition for casting the line, or return it from the free rotation condition to the original braking condition.

Another feature of the present invention is that the position in which the fine adjustment of the spool braking force is set can be easily confirmed at once in accordance with the position of the fine adjustment lever, and the lever itself can be set easily.

These and other objects and features of the present invention will become more apparent from the following detailed description of one embodiment thereof taken in conjunction with the accompanying drawings.

DESCRIPTION OF THE PREFERRED EMBODIMENT

Figure 1:
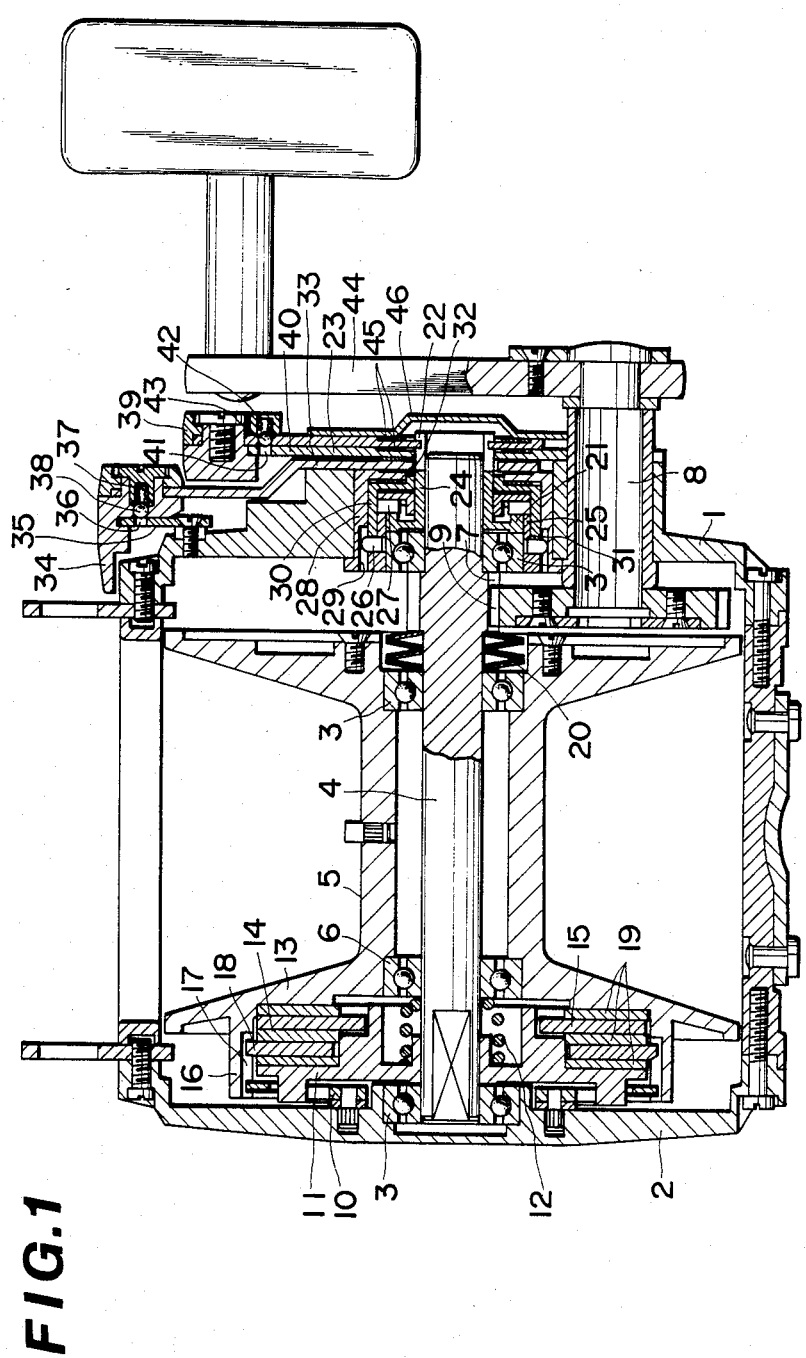
FIG. 1 is a longitudinal sectional view of the present invention.

The present invention will now be described with reference to the accompanying drawings.

A spool shaft 4 is supported slidably in the axial direction by bearings 3 between right and left reel side-plates 1, 2 and a spool 5 is rotatably supported on the spool shaft 4 by bearings 6. A pinion 7 provided integrally with the reel side-plate 1 end of the spool shaft 4 engages with a driving gear 9 of a handle shaft 8 which is pivoted to the reel side plate 1.

Figure 3:
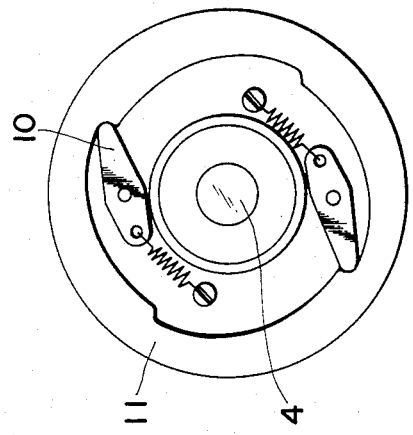
FIG. 3 is a left-hand side view of the friction transmission member of the present invention.

A braking member 11, which is prevented from rotating in reverse by anchor pawls 10 pivoted to the reel side-plate 2, is fitted to the reel side-plate 2 end of the spool shaft 4 so as to be movable only in the axial direction, as shown in FIG. 3. The braking member 11 is urged toward and brought into contact with the bearing 3 by a spring 12 that is interposed between the braking member 11 and the bearing 6. A friction transmission member 14 is interposed between the braking member 11 and a flange 13 of the spool 5.

The friction transmission member 14 has a construction that is well known in the art, it consists of a metal plate 15 engaging with the braking member 11, a metal plate 18 engaging with an engagement groove 17 of a cylinder 16 that is formed on the flange 13 so as to project therefrom, and washers 19 made of leather, synthetic resin or the like, interposed between these metal plates 15 and 18. This friction transmission member 14 transmits the rotation of the spool shaft 4 to the spool.

A leaf spring 20 that is stronger than the spring 12 is interposed between the bearing 6 and the pinion 7 on the reel side-plate 1 side, and the spool shaft 4 beyond the pinion 7 is supported rotatably by the bearing 3. A fine adjustment cam 21 is formed integrally with an inner operation cylinder 24, and a fine-adjustment lever 23 engages with a slit 22 which is formed at the outer end of the cylinder 24. This operation cylinder 24 is fitted to the spool shaft 4 outside the bearing 3.

Pins 26 projecting outward in the radial direction and other pins 27 projecting inward in the radial direction are provided on a support case 25 on the bearing 3. The outwardly projecting pins 26 slidably engage with engagement grooves 29 formed on the inner surface of a bearing cylinder 28 which is fitted and fixed to the reel side-plate 1 and comes into contact with a front cam surface 31 of a cam cylinder 30 which is fitted around the outside of the operation cylinder 24. The inwardly projecting pins 27 come into contact with the fine adjustment cam 21 of the operation cylinder 24.

An adjustment lever 33 engages with slits 32 formed in the outer end of the cam cylinder 30. A knob 34 fixed to the end of the adjustment lever 33 has a ball 38 that is urged by a spring 37 so that the ball can engage with one of a plurality of stop holes 36 in a semicircular stop plate 35 fixed to the outer surface of the reel side-plate 1. The knob 34 can thus be held at any rotational position.

The fine-adjustment lever 23 is shorter than the adjustment lever 33 and its knob 39 has a ball 43 urged by a spring 42 so that the ball resiliently engages with one of a plurality of stop holes 41 of a disc plate 40. This plate 40 is fixed to the reel side-plate 1 and has a diameter smaller than that of the stop plate 35. Thus, both levers 23 and 33 are provided with spring loaded ball detent means (parts 36–38 and 41–43) to enhance their operation. In the drawings, reference numeral 44 represents a handle, 45 in a washer and 46 is a plate cover.

Figure 2:
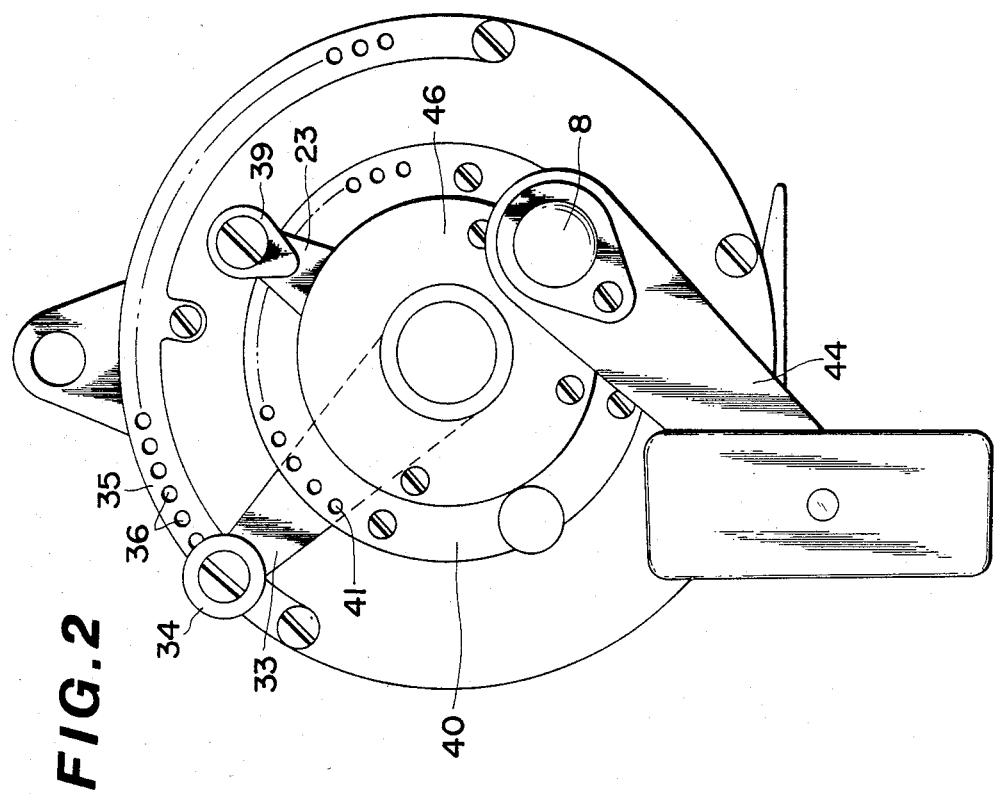
FIG. 2 is a right-hand side view of the present invention.

In the embodiment of the present invention having the construction described above, when the adjustment lever 33 is rotated clockwise in FIG. 2, the cam cylinder 30 rotates so that its cam surface 31 pushes the pins 26 which push the bearing 3 through the support case 25, the pins 27 and the fine-adjustment cam 21. This pressure pushes the spool shaft 4 and then the spool 5 via the leaf spring 20, thereby increasing the frictional force transmitted by the friction transmission member 14, making it transmit the rotation of the handle shaft 8 by the handle 44 to the spool 5. When the adjustment lever 33 is rotated counter clockwise, on the other hand, the transmitted frictional force is reduced and the spool braking force can be adjusted over a large range.

When the fine-adjustment lever 23 is rotated clockwise, the operation cylinder 24 rotates and its fine-adjustment cam 21 pushes the bearing 3 directly so that the frictional force transmitted by the friction transmission member 14 is increased by a limited amount. When the fine-adjustment lever 23 is rotated counter clockwise, on the other hand, the transmitted frictional force is reduced by a limited amount and thus the spool braking force can be adjusted within a fine range.

More specifically, when the lever 23 is rotated clockwise in FIG. 2, the operating cylinder 24 rotates integrally therewith because the lever engages with the notched groove 22 in the operating cylinder 24, and the fine adjustment cam 21 of the operating cylinder 24 comes into contact with the pin 27 projecting from the inner surface of the support case 25. However, the support case 25 does not move outwards (towards the handle 44) because the bearing cylinder 28 is attached integrally to the reel side plate 1 by the cam cylinder 30, and the operating cylinder 24 moves the shaft 4 in the inward axial direction via the bearing 3, thereby minutely increasing the frictional transmission force of the frictional transmission member 14.

Figure 4:
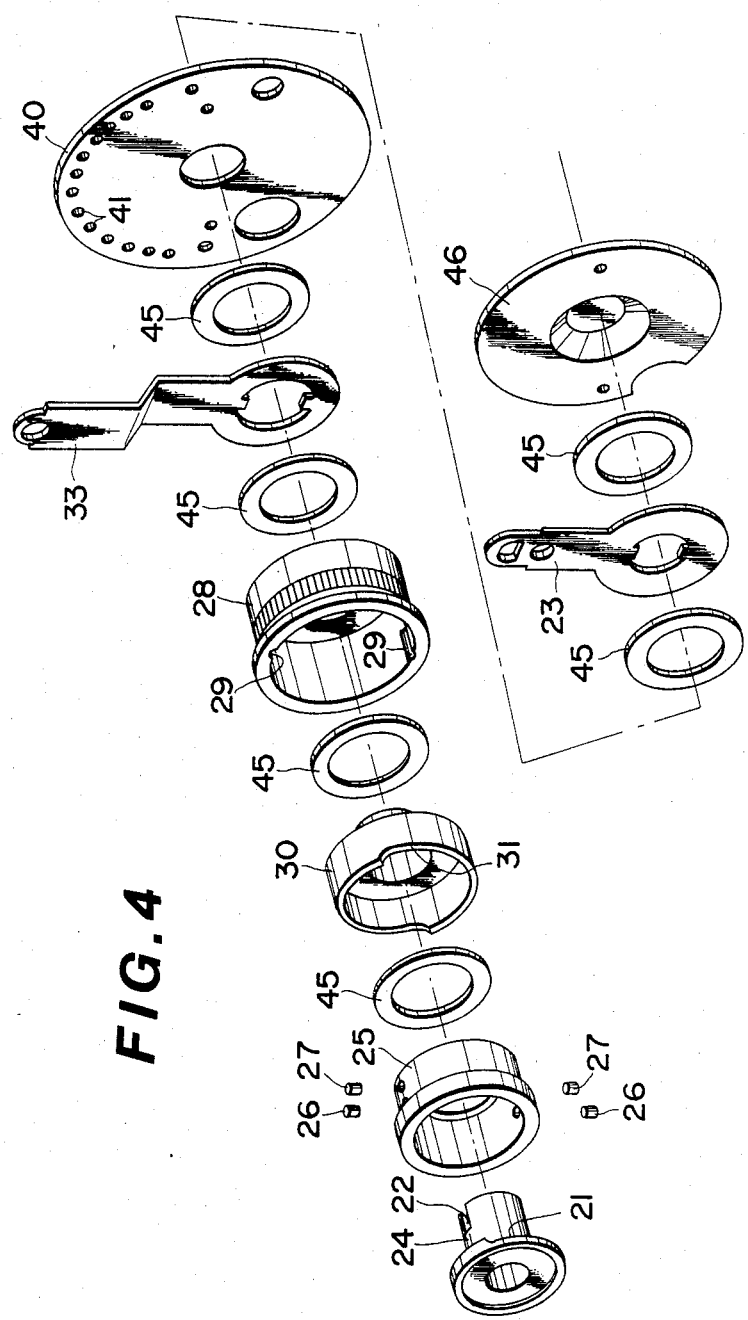
FIG. 4 is an exploded perspective view of the principal components of the present invention.

The coarse and fine adjustments are provided by the difference in the cam surfaces 21 and 31, see FIG. 4. The angle of inclination of the fine adjustment cam surface 21 of the operating cylinder 24 is less than that of the cam surface 31 of the cam 30 of the adjustment operation lever 33, and the corresponding amounts of axial movement of the shaft 4 are thus in proportion, i.e., surface 31, the coarse adjustment, moves the shaft 4 more than does surface 21. Accordingly, even if the rotation of the adjustment operation lever 33 is the same as heat of the fine adjustment operation lever 23, the degree of axial motion by the shaft 4 is correspondingly different.

Accordingly, after the spool braking force is roughly set by the adjustment lever 33 in accordance with the kind of fishing and the kind of fish the fisherman intends to catch, the spool braking force is then fine-adjusted by the fine-adjustment lever 23 before fishing. To pay out the fishing line, both the adjustment lever 33 and fine-adjustment lever 23 are simultaneously rotated fully counterclockwise. The fishing line is paid out while the spool 5 is thus able to rotate freely. The fishing can be done immediately by rotating both the adjustment lever 33 and fine-adjustment lever 23 back to their original positions after the fishing line is paid out.

While the invention has been described in detail above, it is to be understood that this detailed description is by way of example only, and the protection granted is to be limited only within the spirit of the invention and the scope of the following claims.

What is claimed is:

1. A fishing reel comprising a pair of reel side plates, a spool shaft and bearing means to mount said spool shaft on said pair of reel side plates for rotational motion around its axis and for axial motion along its axis, a spool and means to mount said spool on said spool shaft, friction transmission means interconnecting said spool and said spool shaft, means for adjusting the friction force provided by said friction transmission means, said means for adjusting said friction force comprising fine and coarse adjustment means, said fine and coarse adjustment means being substantially separated from each other and each including a separate operating lever and separate cam means, both of said fine and coarse adjustment cam means being arranged for cooperation with said spool shaft to move said spool shaft axially to in turn control the friction force provided by said friction transmission means, means to mount said two separate operating levers outside one of said reel side plates in such a manner that a user of said fishing reel can operate both said levers substantially simultaneously with no more than two fingers of one hand to thereby quickly and easily adjust both said fine and coarse adjustment means substantially simultaneously, each of said fine and coarse cam means comprising a cam surface and said fine and coarse cam means cam surfaces being so configured that substantially equal motions of said two levers will produce a substantially larger axial translation of said spool shaft under the control of said coarse adjustment cam means that the relatively smaller amount of axial translation of said axial spool shaft produced by said fine adjustment cam means;

each of said fine and coarse adjustment means comprising a separate cylinder-like member, each of said cylinder-like members being formed with one of said fine and coarse cam surfaces, and said cylinder-like members being mounted in nested arrangement at one end of said spool shaft with both said cam surfaces being operative to urge said bearing means at said one end of said spool shaft in an axial direction.

2. The fishing reel of claim 1, and separate sliding pin drive means drivingly interconnecting each of said fine and coarse operating levers with its respective cylinder-like member.

3. The fishing reel of claim 1, wherein said coarse adjustment cylinder-like member is nested around the outside of said fine adjustment cylinder-like member.

4. The fishing reel of claim 1, wherein said coarse adjustment lever is radially larger and is arranged axially closer to the outside surface of said one reel side plate than said fine adjustment lever.

5. The fishing reel of claim 1, and separate spring loaded ball detent means between each of said fine and coarse adjustment levers and respective cooperating means on said one of said reel side plates.

6. The fishing reel of claim 5, wherein each of said spring loaded ball detent means comprising a ball spring loaded axially outwardly towards said one of said reel side plates at the outer operating end of each of said operating levers, and said cooperating means comprising a respective member carried on said one of said reel side plates and each formed with a set of stop holes each cooperable with its respective spring loaded ball.

* * * * *